US007834803B2

(12) United States Patent
Weinstein

(10) Patent No.: US 7,834,803 B2
(45) Date of Patent: Nov. 16, 2010

(54) ELECTRONICALLY STEERED, DUAL-POLARIZED, DUAL-PLANE, MONOPULSE ANTENNA FEED

(75) Inventor: Michael E. Weinstein, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 33 days.

(21) Appl. No.: 12/230,666

(22) Filed: Sep. 3, 2008

(65) Prior Publication Data

US 2010/0052987 A1 Mar. 4, 2010

(51) Int. Cl.
*G01S 13/00* (2006.01)

(52) U.S. Cl. .......................... 342/70; 342/80; 342/149; 342/158

(58) Field of Classification Search .................. 342/62, 342/70, 80, 149, 158
See application file for complete search history.

(56) References Cited

U.S. PATENT DOCUMENTS

| | | | | |
|---|---|---|---|---|
| 5,923,290 | A * | 7/1999 | Mikami et al. | 342/374 |
| 6,762,711 | B1 * | 7/2004 | Doerfler | 342/70 |
| 2002/0165001 | A1 * | 11/2002 | Phillips et al. | 455/500 |
| 2008/0122683 | A1 * | 5/2008 | Howley et al. | 342/149 |
| 2008/0291083 | A1 * | 11/2008 | Chang | 342/354 |

* cited by examiner

*Primary Examiner*—Thomas H Tarcza
*Assistant Examiner*—Timothy A Brainard
(74) *Attorney, Agent, or Firm*—Birch, Stewart, Kolasch & Birch, LLP

(57) ABSTRACT

A method and apparatus for electronically steering a RADAR beam across an array of feed horns by moving the phase center of the beam to different origination points on the array—each origination point being the phase center of a feed horn pair. Variations include polarized beams, polarized feed horns, dual-beam systems, dual direction steering, diagonal steering, and cross-polarized wire grids to control beam-width.

42 Claims, 10 Drawing Sheets

-prior art-

- prior art -

ELECTRONICALLY STEERED, DUAL-POLARIZED, DUAL-PLANE, MONOPULSE ANTENNA FEED

BACKGROUND

1. Field of the Invention

The present invention relates generally to RADAR systems and more particularly to the control and steering of RADAR beams and to the arrangement and structure of monopulse feed horn antenna arrays.

2. Description of Related Art

RADAR tracking systems are a fixture in most military arsenals, airports, and weather stations. They may be used to detect incoming projectiles, track aircraft trajectories, and/or locate and track targets of interest.

RADAR systems include transmitter, receiver, and processing portions. RADAR systems also contain one or more antennas, depending on the RADAR type and the intended application, and the antennas are often mechanically steered to detect targets in a certain field of view. Space is a concern in modern RADAR applications, requiring smaller and more efficient RADAR systems. Cost may also be a factor, especially in single-use applications such as RADAR-guided munitions.

Monopulse RADAR is variation of conical scanning RADAR wherein the RADAR signal contains additional information to avoid problems caused by changes in signal strength. Monopulse RADAR systems typically transmit a signal on one antenna beam and simultaneously receive the target's reflected signal with two beams, which provide two simultaneous received signals. The signal strengths and, in some types of monopulse radars, the relative phases of these of received signals are then compared. Unlike other conical scanning systems, which compare a signal return to the mechanical position of the antenna, monopulse systems compare the signal return with two beams. Because the comparison takes place based on a single pulse, the system is called "monopulse." Since monopulse systems compare a signal with itself, there is no time delay in which signal strength can change. Changes in signal strength during a pulse are possible, but they are usually extremely short in duration and have a minimal effect on pulse detection capabilities. Monopulse radar systems also provide increased angle-of-arrival accuracies and faster angle-tracking rates.

Once the RADAR system locates a target, the location information may be sent to a pointing system that will, as appropriate, mechanically re-orient the RADAR antenna so that the boresight will be aligned with the target. Monopulse RADAR technology of this type currently enjoys wide use and is found in several forms of disposable ordinance, including missiles and other guided munitions.

Specifically with respect to RADAR-guided munitions, a mechanical steering solution may have some limitations. There are a number of moving parts that, given the high-impact operating environment most munitions occupy, may be susceptible to failure and malfunction due to mechanical stresses. Also, the number of overall components leads to increases in both cost and weight. For a single-use item such as a missile, reduced cost is an obvious advantage and reduced weight may either increase operating range or reduce fuel requirements.

A RADAR system capable of steering its main lobe for purposes of target acquisition and tracking without mechanical servos and actuators would allow for the production of RADAR-guided munitions of reduced cost and increased reliability. A monopulse RADAR system that does not require a mechanical steering solution may be lighter and less expensive to produce, making it a more attractive option for aerospace applications and single-use applications.

SUMMARY

The present invention relates to electronically steering a monopulse RADAR beam via an array of feed horn antennas. Steering a monopulse beam originating from the feed horn array is accomplished by activating different sets of feed horn antennas within the array, thereby changing the origination point of the beam in the plane of the array.

Specifically, the present invention relates to a method and apparatus for electronically steering a monopulse RADAR beam in a plane. This method comprises activating a pair of RADAR feed horns in a feed horn array to produce a monopulse RADAR beam and then activating a second pair of RADAR feed horns in the feed horn array during or after deactivating the first pair of RADAR feed horns, thereby changing the origination point of said monopulse RADAR beam within said array.

The present invention also relates to an electronically steered monopulse RADAR system comprising an array of at least seven diagonal feed horn antennas, with at least half of the antennas having a first polarization and all remaining antennas having a second polarization. The system array may also have an array of wires such that the wires are arranged in rows and columns, with the columns relating to the first polarization and the rows relating to the second polarization. The system may further contain a waveguide comparator for a horn pair having the same polarization and radio-frequency (RF) switches, with each switch connected to either two feed horn antennas having the same polarization or a feed horn and another RF switch.

A polarized RADAR beam may be steered in this system within a plane containing the axes of two feed horns that form a monopulse beam pair by selectively switching co-planar, similarly polarized feed horn pairs on or off in order to move the phase center of the beam across the feed horn array. A polarized RADAR beam may be steered in this system in a plane perpendicular to the axes of two feed horns that form a monopulse beam pair by selectively switching individual, adjacent, co-planar, similarly polarized feed horns on and off, thereby moving the active horn pair across the array in a steering plane, shifting the phase center of the beam.

Further, the present invention relates to a device for electronically steering a RADAR beam in a monopulse RADAR system. Such a device may comprise a commutative RF switching network that sequentially activates and deactivates polarized feed horn pairs within a feed horn array so that the origination point of a monopulse RADAR beam generated by the array moves across at least one plane of the face of said array, thereby changing the field of view of the RADAR system.

Single polarized beam embodiments of electronically-steered monopulse RADAR systems according to the present invention may employ diagonal feed horn antennas, and antennas with a single polarization. A feed horn array for dual-plane steering may employ diagonal feed horns of a single polarization and a commutative switching system that activates and de-activates feed horn pairs to move the phase center of the beam across a feed horn array. The steering planes of the feed horn array of such an embodiment are perpendicular to each-other.

Dual polarized beam embodiments of such electronically-steered monopulse RADAR systems may employ diagonal feed horn antennas, and antennas with multiple polarizations.

A feed horn array for dual-plane steering may employ feed horns of two different polarizations, with at least half of all the antennas in the array having one polarization and the remaining antennas having a second polarization. Embodiments of such electronically-steered monopulse RADAR systems may also dielectrically load the feed horn antennas. Embodiments using two polarized beams may also have the two beam polarizations be orthogonal to each-other.

Embodiments of such electronically-steered monopulse RADAR systems may be used in conjunction with a range of reflectors, including Cassegrain reflectors. A Cassegrain configuration may provide the same focal length as a prime focus reflector with a smaller size assembly, allowing such a system to be used in space-constrained settings. Because the present invention does not require mechanical actuators to accomplish beam steering, it may also enable reductions in the cost and weight of RADAR systems constructed according to the present invention.

Embodiments of such electronically-steered monopulse RADAR systems may also allow for beam steering in more than one planar direction by increasing the number of feed horn antennas in the feed horn array, or by changing the feed horn array configuration, and modifying the associated switching network accordingly.

One particular embodiment of a RADAR system according to the present invention may employ a linear-vertical and a linear-horizontal polarized RADAR beam, and a two-dimensional array of alternating horizontally-polarized and vertically-polarized diagonal feed horns. In such a system, the commutative switching network allows for both beams to be steered in both the horizontal and vertical steering planes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

The drawings will be described in detail in the course of the detailed description of the invention.

DETAILED DESCRIPTION OF THE INVENTION

The following detailed description of the invention refers to the accompanying drawings. The same reference numbers in different drawings identify the same or similar elements. In addition, the following detailed description does not limit the invention. Instead, the scope of the invention is defined by the appended claims and equivalents thereof.

The present invention seeks to address the problems of cost, weight, and mechanical failure in RADAR tracking systems through the use of an electronically-steered monopulse RADAR system. It implements a dual-polarized, dual-plane monopulse, switched beam approach with a minimum number of switches and four-port RF devices. The system is based on a beam generated by a set of dielectrically-loaded diagonal feed horns having two orthogonal polarizations (e.g., vertically polarized horns and horizontally polarized horns) and an array of wires to control the beamwidth for each horn pair, enabling the creation of monopulse beams of controlled width and intensity in each of the polarization planes.

Figure 1:
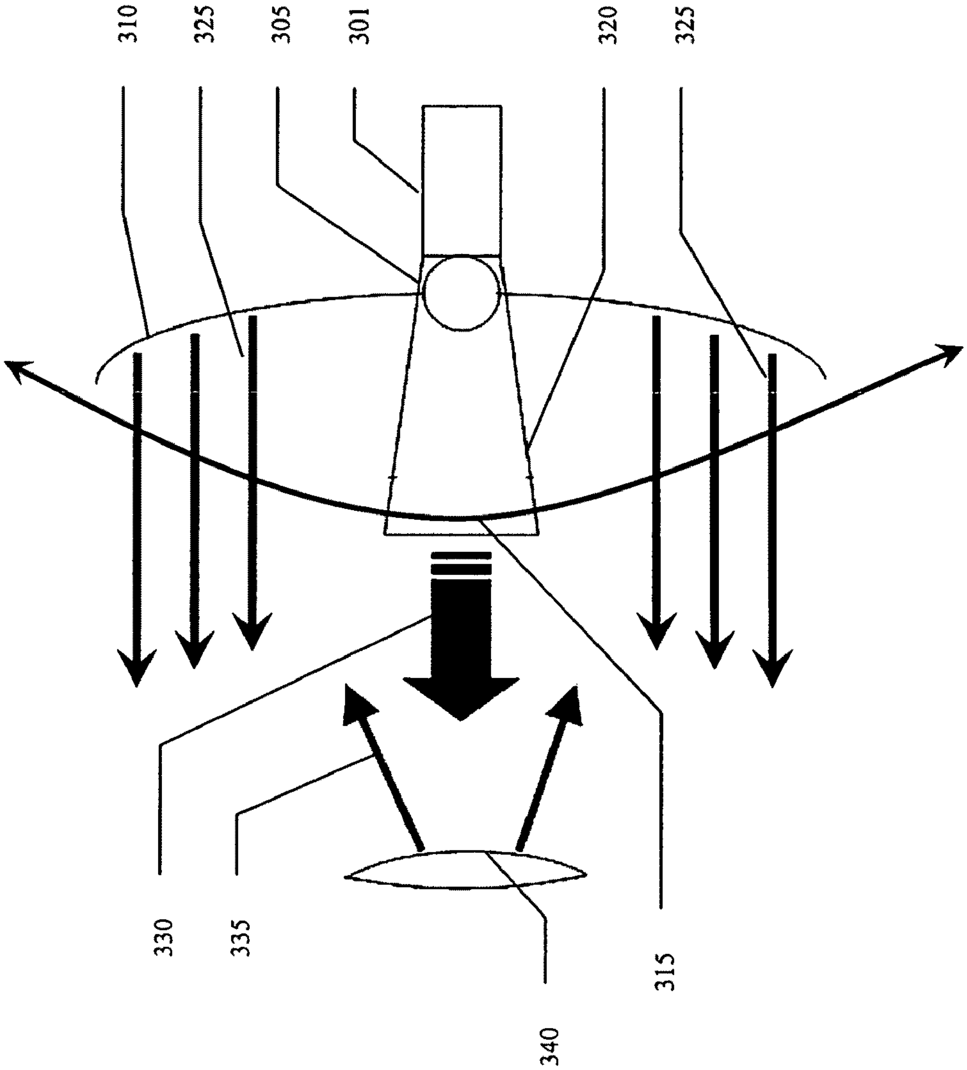
FIG. 1 shows a side-view of an embodiment of a mechanically-steered Cassegrain RADAR system.

FIG. 1*a* illustrates an embodiment of a mechanically actuated RADAR system in a Cassegrain configuration. The basic operating principles of a Cassegrain antenna are widely known in the art and are briefly reviewed here. A feed horn or feed horn array 320 emits a RADAR beam 330 that reflects off a sub-reflector 340, directing the beam 335 back at the main reflector 310, which then reflects the beam 325 outward again. The Cassegrain configuration has a focal length equal to approximately twice the distance between the sub-reflector 340 and the main reflector 310, allowing for reductions in size while preserving focal length.

The horn 320 is connected to the RADAR feed network 301 through a mechanical actuator 305. The horn is also mechanically connected to the main 310 and secondary 340 reflectors. The actuator allows the horn 320 and reflectors 310, 340 to move in tandem across a certain range 315. Moving the entire assembly does not change the angle of incidence of the beam the horn emits 330 relative to the reflectors, but changes the direction of the RADAR beam 325 emitted by the antenna. This approach, while functional, may not be well suited to high-shock and high-impact environments where there is a potential for mechanical failure. A failure of the actuator 305 compromises the ability to steer the RADAR beam and limits the usefulness and usability of this RADAR system.

Figure 2A:
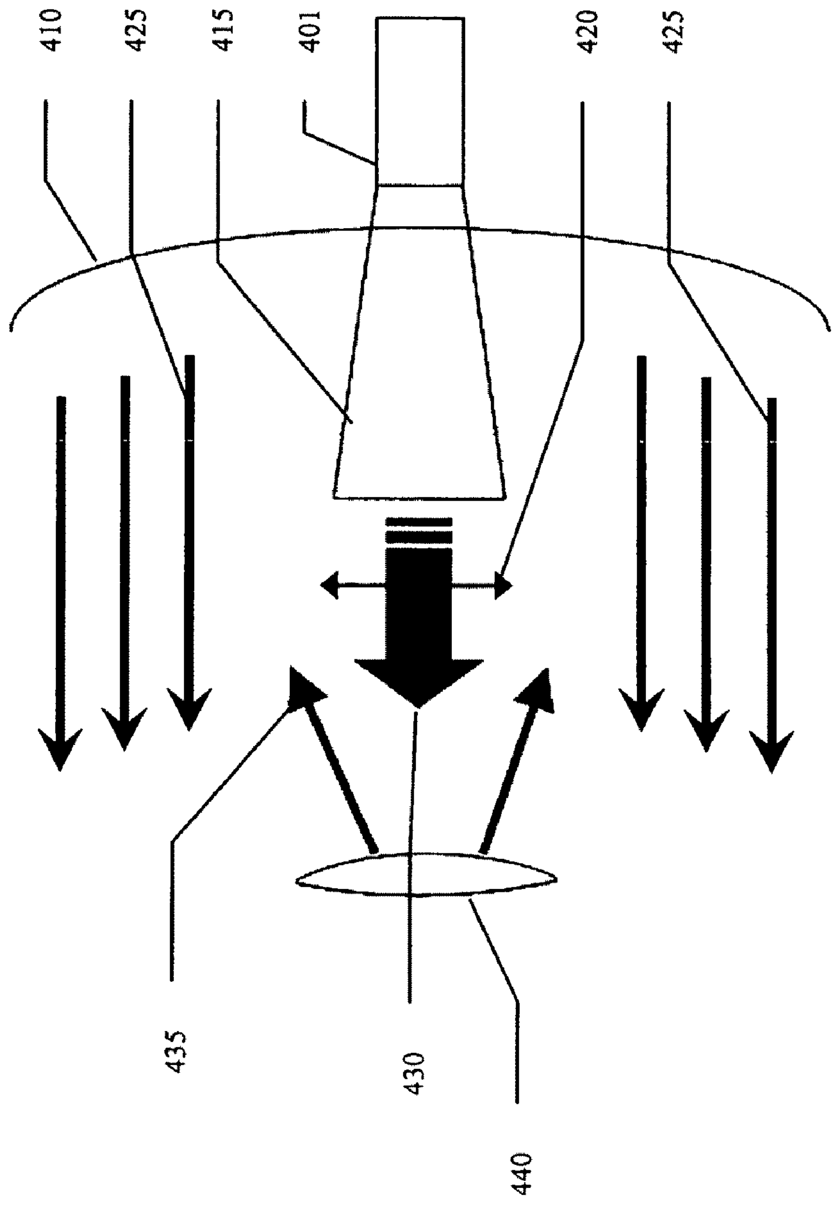
FIG. 2*a* shows a side-view of a Cassegrain-configured embodiment of the inventive system allowing for electronic RADAR beam steering.

FIG. 2*a* shows an embodiment of an electronically steered RADAR system according to the present invention in a Cassegrain configuration. Like the mechanically actuated embodiment above, a RADAR signal 430 is emitted from the feed horn or feed horn array 415 towards a sub-reflector 440, which reflects the RADAR beam 435 towards a main reflector 410. The main reflector 410 then directs the RADAR beam 425 outward towards potential targets. Unlike the mechanically actuated embodiment above, the feed horn array 415 in the present embodiment is directly connected to the RADAR feed network 401. Electronically steering the RADAR beam 430 within the feed horn array 415 in a planar direction 420 is accomplished through a commutative switching network (not shown) that connects the feed horn 415 to the RADAR feed network 401. This is accomplished by moving 420 the phase center of the beam 430 across the antenna array. The present invention does not require a Cassegrain configuration and will operate equally well in prime focus, Gregorian, and lens embodiments.

Beam polarization is independent of the collimating device or configuration employed. The dual-polarization aspect of the present invention may allow for the polarizations of the beams to be orthogonal. The orthogonal beam polarizations may also be circular or elliptical, or may employ a polarizer that converts linear polarizations to circular ones. The present invention uses a dual-polarization concept that may be dual-linear, dual-circular, or dual-elliptical, with the orthogonal circular or elliptical polarizations being left-hand and right-hand oriented.

Figure 2B:
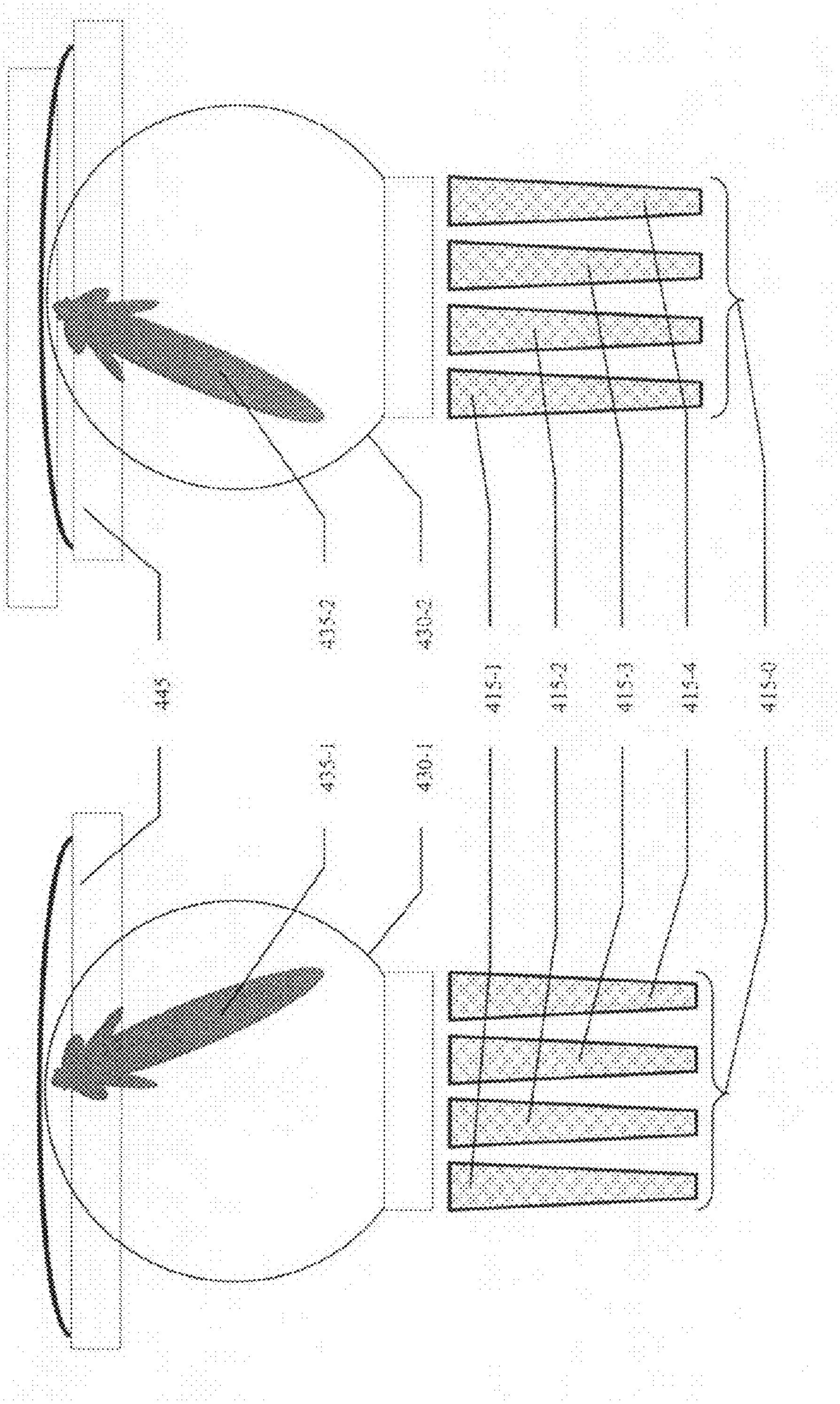
FIG. 2*b* shows a more detailed view of the electronic steering aspect of the RADAR system in FIG. 2*a;*

FIG. 2*b* illustrates the beam emission aspect of an embodiment of an electronically steered RADAR system according to the present invention. The feed horn array 415-0 consists of a plurality of feed horns. A pair of horns 415-1, 415-1 is activated, illuminating the reflector 445 with a feed beam 430-1. Because the phase center of the feed beam 430-1 is offset from the center of the feed horn array 415-0, the reflected RADAR beam 435-1 formed by the reflector is steered opposite to the direction of the offset. The feed beam 430-1 is not significantly skewed, so there is minimal illumination imbalance.

Similarly, when a different set of feed horns 415-3, 415-4 is activated, the phase center of the feed beam thus produced 430-2 is offset in a different direction from the center of the feed horn array 415-0. This phase center offset similarly causes the RADAR beam 435-2 formed by the reflector 445 to be steered opposite to the direction of the phase center offset.

Figure 3A:
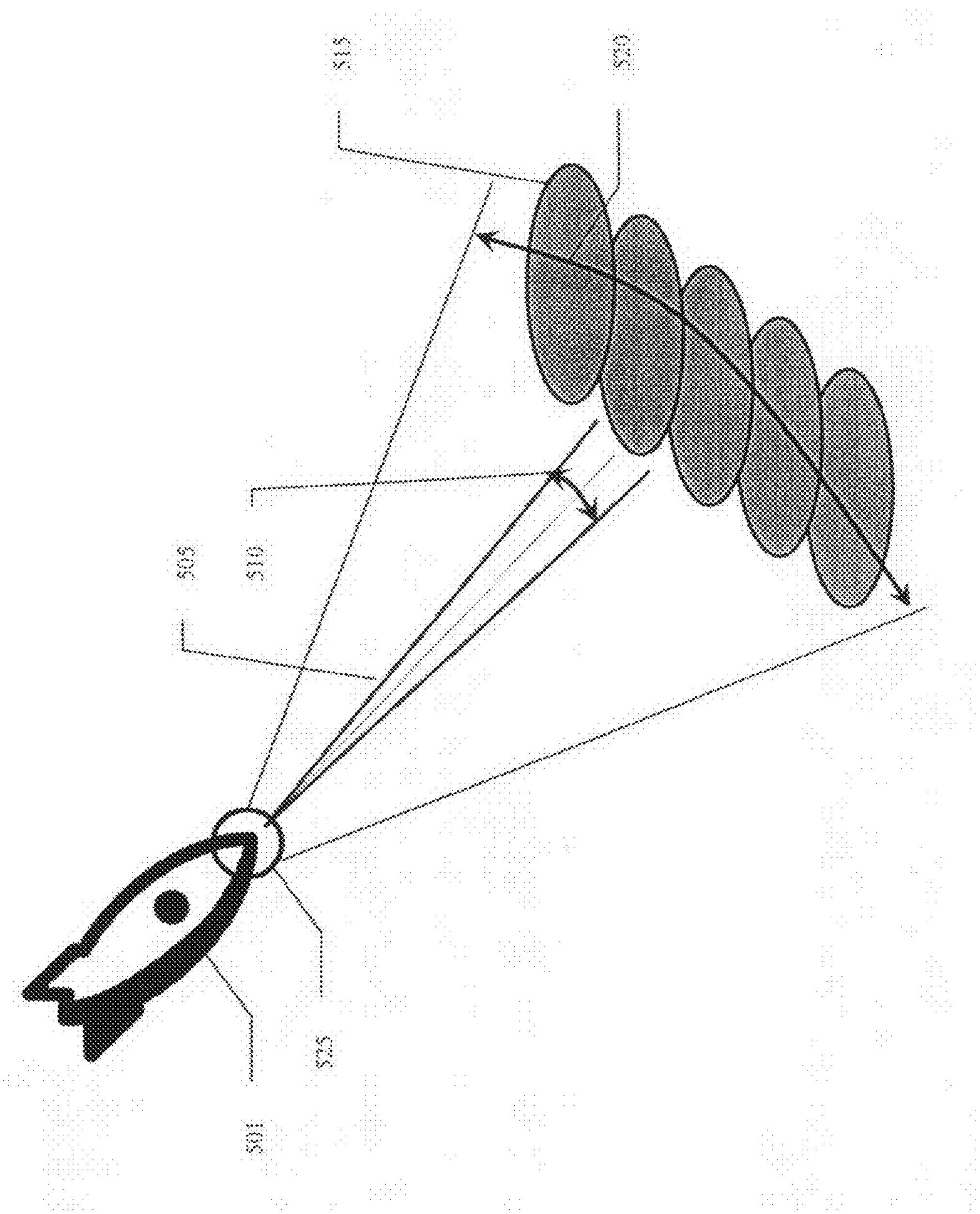
FIG. 3*a* shows a guided munition equipped with an embodiment of the inventive RADAR system for target detection.

FIG. 3*a* shows a potential application of an embodiment of an electronically steered RADAR system according to the present invention. In this embodiment, the RADAR system 525 is housed in the nose of a guided munition 501 and is being employed as a target seeker. The emitted RADAR beam 505 has a certain width 510 that is less than the desired field of view 520 for the munition 501. In order to provide coverage for the desired range of view 520 so that potential targets 515 can be located and tracked, some form of beam steering is required in the RADAR target seeker 525.

Figure 3B:
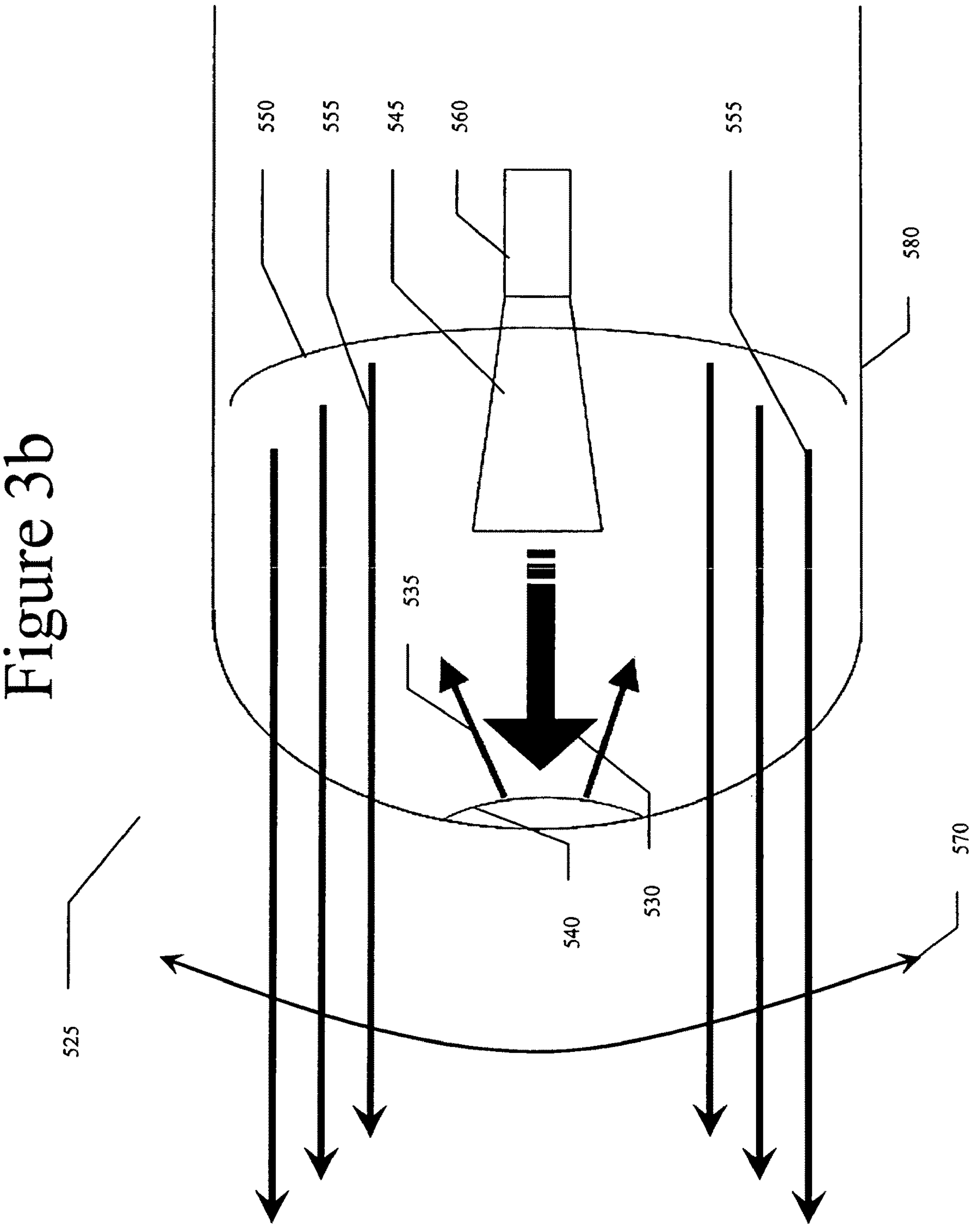
FIG. 3*b* shows a side view of an embodiment of the inventive RADAR system housed within a guided munition.

FIG. 3*b* provides a more detailed illustration of the RADAR target seeker 525 from FIG. 3*a*. The RADAR seeker system is housed within the guided munition housing 580 and arranged in a Cassegrain configuration to save space. The sub-reflector 540 is attached to the front of the munition housing 580. Changing the phase center of the feed beam 530 within the feed horn array 545 changes the angle of the reflected feed beam 535 coming from the sub-reflector 540 to the main reflector 550. This in turn affects the angle of the RADAR beam sent out by the main reflector 555 and enables the RADAR seeker 525 to cover the desired range of view 570. The commutative switching network (not shown) that enables electronic RADAR beam steering may either be part of the feed horn array assembly 545 or the RADAR feed network 650. Different embodiments of missile seeker or other tracking systems according to the present invention may employ alternative collimation configurations, such as prime focus, Gregorian, or lensing, without fundamentally altering the underlying beam steering concept.

The inventive concept may include the elimination of orthogonal mode transducers and internally-terminated RF ports. This allows for a reduction in the size and weight of the RADAR system and also reduces the overall complexity of the system with respect to number of components. This results in a RADAR system that is cheaper to manufacture, comprising fewer components, having no mechanically actuated components that may affect beam steering due to failure or malfunction, and lighter in weight than similar, mechanically-steered RADAR systems currently in use.

Alternative embodiments of the present invention may employ different reflector configurations such as lens, prime focus and Gregorian. Embodiments of the present invention may be employed in a variety of operating environments including weapons guidance systems, vehicle sensor and guidance systems, threat detection systems, missile detection and tracking, air traffic management systems, and RADAR jamming devices.

Figure 4:
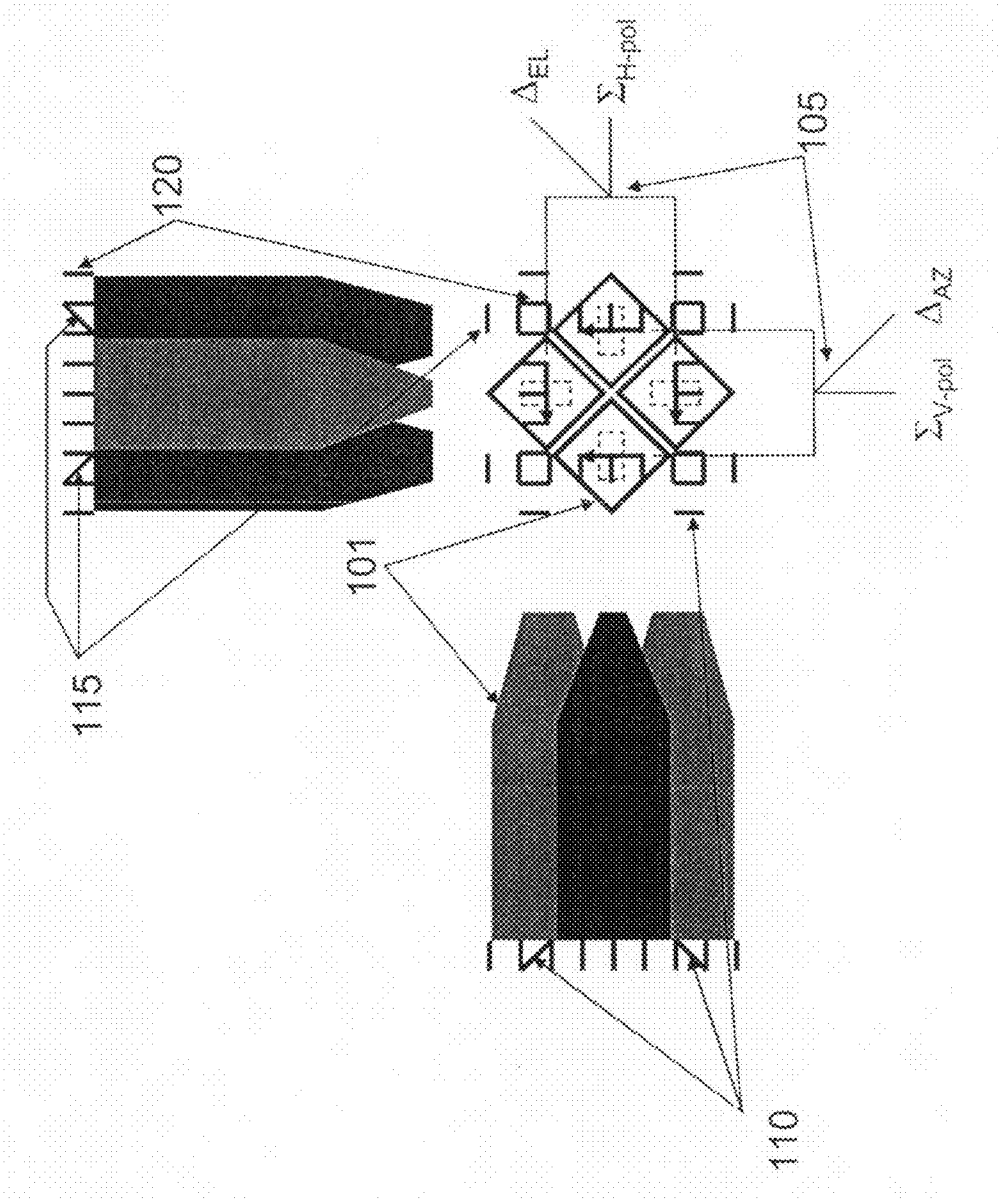
FIG. 4 shows an embodiment of a prior-art four-horn monopulse RADAR system.

FIG. 4 shows a monopulse feed configuration comprising four, dielectrically loaded, diagonal horns of a type currently employed in a missile targeting system. The horns are dielectrically loaded to reduce the distance between horns and for ease of manufacturing. This embodiment employs monopulse feed horns because of the ability of monopulse RADAR to quickly acquire angle and range data. The diagonal horns and polarization wires are employed to provide improved illumination of a sub-reflector in both the E and H planes for both sum and difference modes in both polarizations.

Each feed horn 101 is polarized, with two horns having one polarization, in this case vertical polarization, and the other two horns having an orthogonal polarization, in this case horizontal polarization. Each horn pair feeds into a waveguide comparator 105 that generates sum and difference outputs, allowing the target range and angle to be determined. The horn array is placed near a wire grid 120 composed of rows of wires 110 that narrow the beamwidth of the vertically polarized horn pair but are cross-polarized to the horizontally polarized horn pair and columns of wires 115 that narrow the beamwidth of the horizontally polarized horn pair but are cross-polarized to the vertically polarized horn pair. This cross-polarization is preferred because the beamwidth of both horn pairs is narrower in the H-plane since the horns are arrayed in the H-plane. The wire grid 120 reduces the E-plane beamwidth to approximately equal the intrinsically smaller H-plane beamwidth of a horn pair. Such system is useful for applications like RADAR-guided missiles, where a narrow beam is preferred for maintaining a lock on a target while minimizing jamming signals and clutter. The dual-polarization aspect permits the RADAR system to get both polarizations back at the same time and perform analysis using sum and difference modes on each polarization. This further improves accuracy and target tracking capabilities.

The inventive concept allows for two polarized monopulse RADAR beams, each having a polarization orthogonal to the other, created by an array of four feed horns where two horns have one polarization and two horns have a second polarization, to be steered across at least one steering plane in a feed horn array through a commutative switching system. The basic concept behind beam steering is illustrated in FIG. 5*a*, which shows single-plane, dual-polarized beam steering.

Figure 5A:
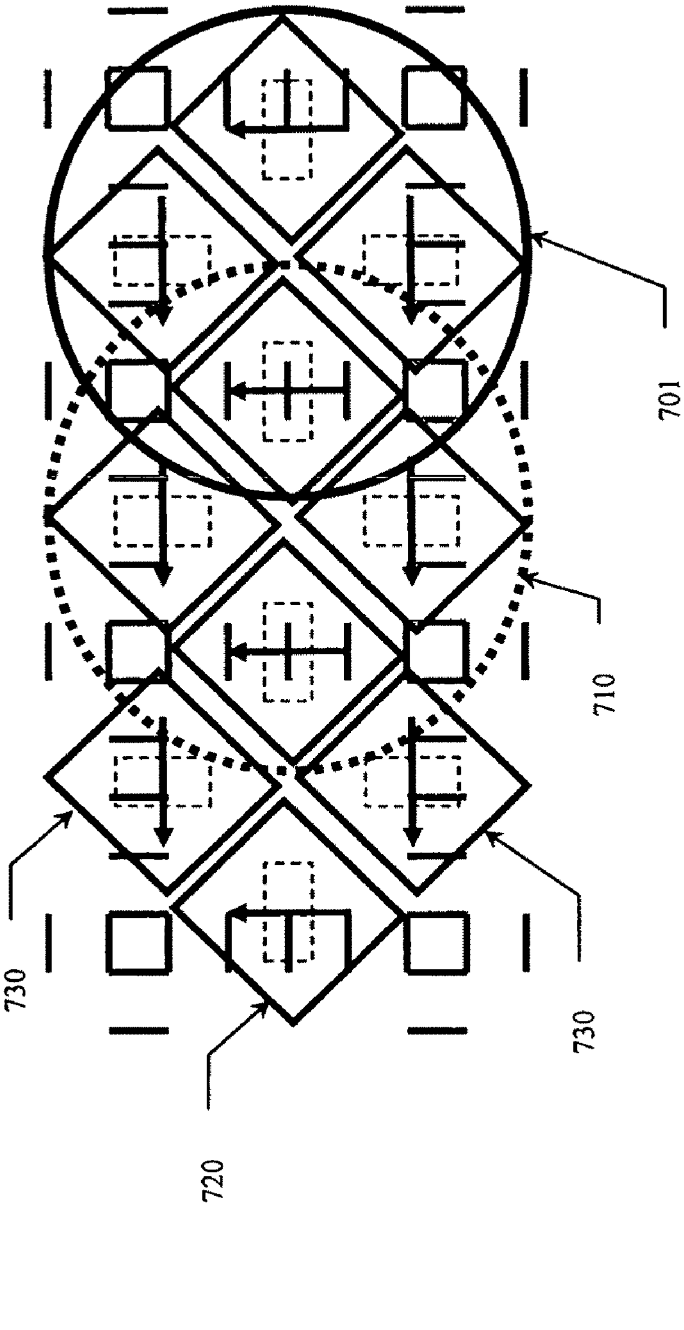
FIG. 5*a* shows an embodiment of the invention that illustrates single-direction steering of two orthogonally-polarized RADAR beams.

In the embodiment shown in FIG. 5*a*, the feed horn array consists of one row of horizontally-stacked, vertically-polarized feed horns 720 one row of vertically-stacked, horizontally polarized feed horn pairs 730. This embodiment generates one vertically polarized monopulse beam from two horizontally-stacked, active, vertically polarized feed horns, and one horizontally polarized monopulse beam from two vertically-stacked, active, horizontally polarized feed horns. Both beams are emitted by an active four-horn set 701 containing a vertically polarized and a horizontally polarized horn pair the same way as discussed with respect to FIG. 4. The inventive concept, however, allows for the beam phase center to move to an adjacent four-horn set 710, thereby steering the beam.

In the embodiment shown, the horizontally polarized monopulse beam is perpendicular-plane steered, and the vertically polarized monopulse beam is in-plane steered. Perpendicular-plane beam steering is accomplished in this embodiment by switching off an active, vertically-stacked, horizontally polarized horn pair and switching on a horizontally-adjacent horn pair of the same type. In-plane beam steering is accomplished in this embodiment by switching off one active, horizontally-stacked, vertically polarized feed horn of a feed horn pair, and switching on a similar feed horn adjacent to the still-active vertically polarized feed horn on the other side. Carrying out these operations in tandem deactivates one four-horn set 701 and activates an adjacent four-horn set 710, thereby moving the phase center of both beams.

Embodiments of the present invention may employ multiple variations of the inventive concept, and may switch the polarizations of the feed horns, or employ circular polarizations instead of linear polarizations. The combination in-plane, perpendicular-plane steering concept may be extended to steering in two planar directions, and may be further extended to steering in a diagonal direction. Feed horn array shape and movement of the beam phase centers across it are limited only by cost, weight, and complexity of the associated switching network.

The inventive concept allows for beam steering in a RADAR system of the type described above through a commutative switching network that allows the phase center of the beam to move across the feed horn array. This concept may be extended to multiple beams by the addition of more feed horn sets and RF switches along the beam plane, and may also be extended to allow for beam steering in multiple planes through the addition of more four-horn sets and RF switches beyond the beam plane. In a two-plane steering solution, the comparators and the feed horns would require switching. One set of comparators is required for in-plane steering, and a second set is required for perpendicular-plane steering.

Figure 5B:
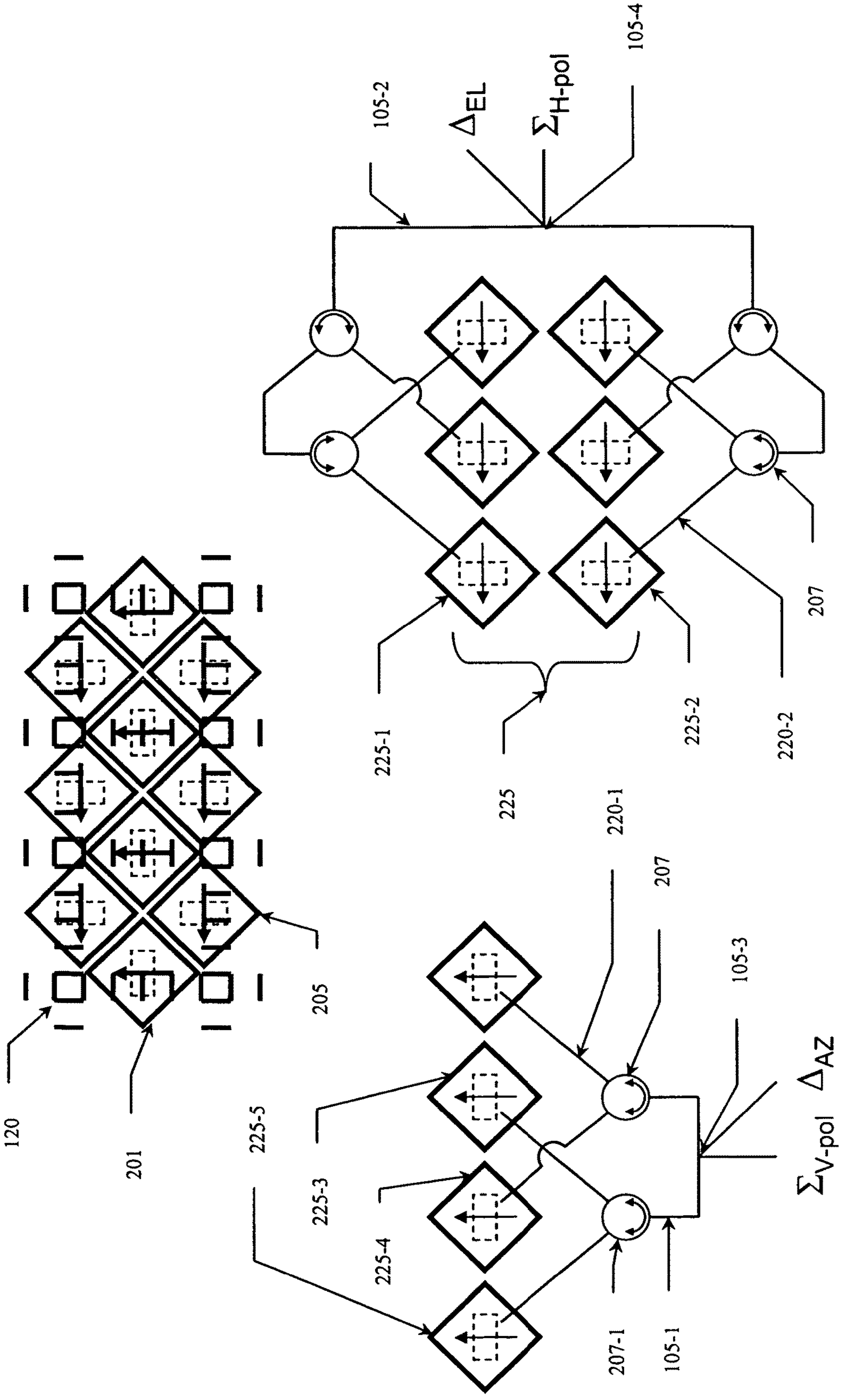
FIG. 5*b* shows an embodiment of the invention that allows for beam steering in one direction associated with a polarization plane.

FIG. 5*b* shows an embodiment of the invention that provides beam steering in one plane. In this embodiment, the feed horns are made of metalized Rexolite. This allows the feed horns to be molded rather than machined. The vertically polarized horns 201 are all connected to a waveguide comparator 105-3 through switching circulators 207. The horizontally polarized horns 205 are similarly connected to a waveguide comparator 105-4 through switching circulators 207, and the wire grid array 120 covers all the horns in the array to provide beamwidth control. The waveguide and switching circulators of the present embodiment are purely illustrative and not meant to be limiting. Alternative embodiments of the present invention may employ an RF printed circuit board medium, e.g., microstrip, stripline, coplanar waveguide, etc., for the monopulse comparator. Other switches and attendant switch control circuits may be used in place of the switching circulators in alternative embodiments as well. In this embodiment, the vertically-polarized horns are arranged to allow for in-plane steering technique, and the horizontally-polarized horns are arranged to allow for perpendicular-plane steering technique.

The commutative switching network in this embodiment comprises RF circulators 207, which act as switches to connect and disconnect different feed horns from their respective comparator arms 105-1, 105-2. There is a separate switching network for horizontal polarization steering 220-2 and vertical polarization steering 220-1. As shown, the horizontal steering network 220-2 is configured to switch different horn pairs to and from horizontal-beam comparator arms 105-2. The horizontal comparator arms are therefore always connected to an adjacent pair of vertically-stacked, horizontally polarized feed horns 225-1, 225-2. For steering in the horizontal aspect, the circulators 207 are controlled in tandem so as to disconnect an upper horn 225-1 and a lower horn 225-2 from the comparator arms 105-2 and connect a different, vertically-stacked horn pair to move the phase center of the feed beam.

In the vertical steering aspect of the depicted embodiment of the present invention, the RF circulators 207 work independently to connect and disconnect individual feed horns 225-3, 225-4 to and from the vertical-beam comparator arms 105-1. The vertical comparator arms 105-1 are always connected to an adjacent pair horizontally-stacked, vertically polarized feed horns 225-4, 225-5. In this embodiment, the phase center of a beam emanating from an activated horn pair 225-5, 225-4, is steered in the horizontal plane by disconnecting one of the feed horns 225-5 from the comparator arms 105-1 and connecting the other feed horn 225-3 joined to the comparator arms 105-1 by that same RF circulator 207-1. The horizontal and vertical steering aspects work in tandem to steer a monopulse RADAR beam by sequentially activating adjacent sets of four horns, two vertically-stacked horizontally polarized and two horizontally-stacked vertically polarized, to move the phase center of the feed beam across the feed horn array.

For both steering aspects, the size of the array may be expanded arbitrarily, limited only by cost, size, and weight concerns. Because the in-plane and perpendicular-plane steering directions are the same direction in the above embodiment, only two four-port comparators are required regardless of array size. For a single-planar-direction steering solution similar to the above-embodiment, the number of switches is determined by the number of horns of each polarization. For a given number "n" of in-plane-steered horns, n-2 two-state switches are required. Furthermore, for a dual-polarized single-planar-direction steering solution, $2n-2$ perpendicular-plane steered horns are required, and an additional $2n-4$ two-state switches.

Alternative embodiments of the present invention may provide beam steering in the vertical plane instead of the horizontal plane, or may employ different combinations of polarizations, including right-hand and left-hand circular or elliptical. Yet further alternative embodiments of the present invention may employ horn configurations that cause controlled, predetermined aperture illumination changes on a reflector during beam steering.

Alternative embodiments of the present invention may employ as few as three adjacent, similarly-polarized diagonal feed horns, or add additional feed horns to provide a broader beam steering range. Other embodiments of the present invention may employ alternative horn configurations such as multi-mode horns, or alternative feed horn materials. Any suitable low-loss dielectric may be molded, electroformed, or machined into a desired form and then metalized. Yet further alternative embodiments of the present invention may employ horn arrays with dynamically configurable polarization properties.

Alternative embodiments of the present invention may employ only in-plane or only orthogonal-to-plane polarized feed horns. Other embodiments may use a different type of switch than an RF circulator for the commutative switching aspect. Yet other embodiments of the present invention may use entirely different network and switching configurations, such as by employing multi-throw switches capable of more than two positions.

Figure 6A:
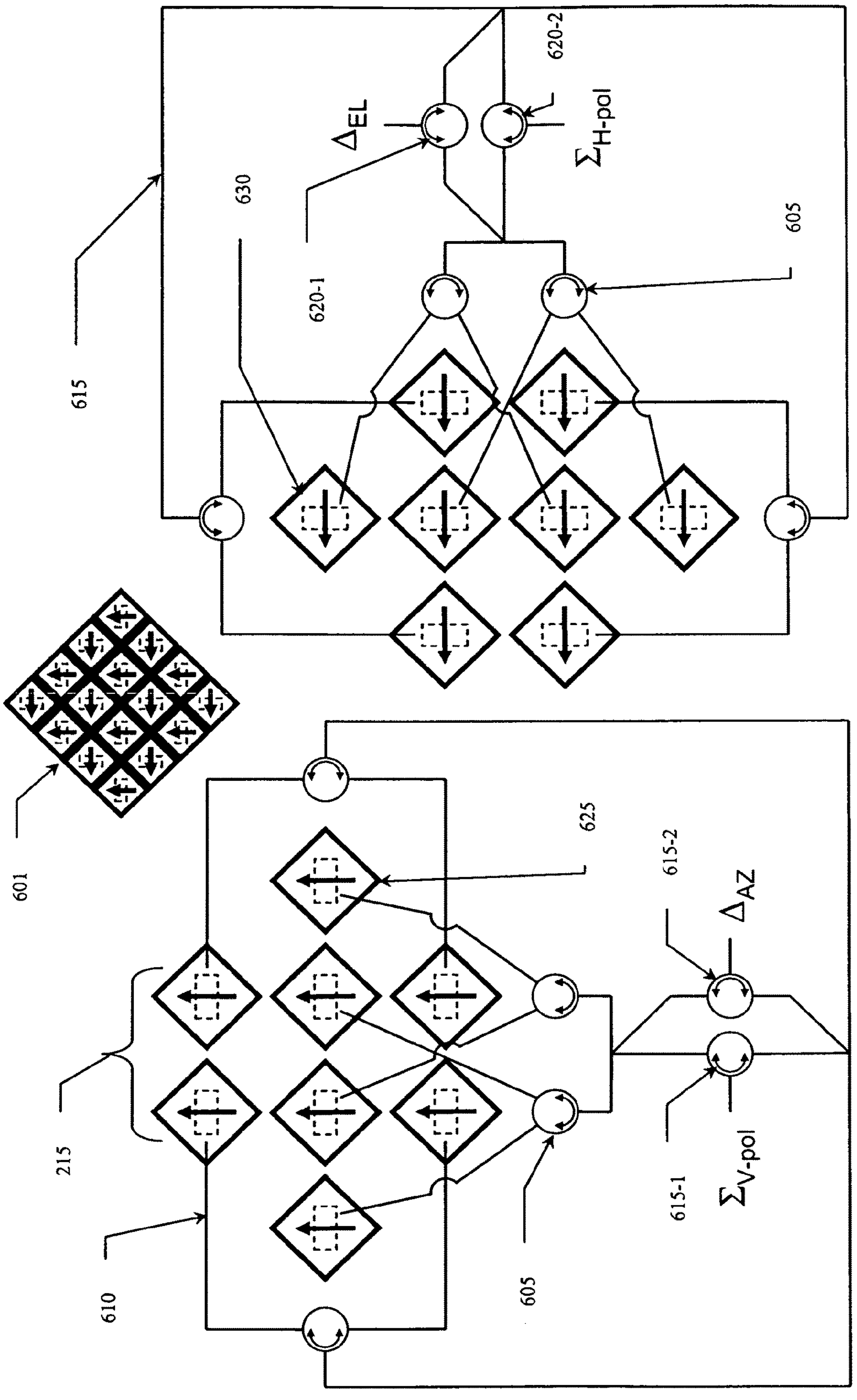
FIG. 6*a* shows an embodiment of the invention allowing for beam steering in two directions, each direction being associated with a polarization plane.

FIG. 6*a* shows an embodiment of the inventive concept extending beam steering capabilities into two planar directions—the vertical and horizontal. The feed horn array 601 in this embodiment is a 4×4 array of dielectrically loaded, diagonal feed horns with alternating polarizations. The commutative switching network 610 for the vertically polarized feed horns 625 and the commutative switching network 615 for the horizontally polarized feed horns 630 both employ RF circulators 605 in this embodiment. The vertically polarized switching network also employs a switching strategy in the waveguide comparator portion on both the sum 615-1 and difference 615-2 operations. This arrangement enables the activation of any adjacent pair of horizontally-stacked, vertically polarized feed horns 625 for either horizontal or vertical steering of a vertically polarized RADAR beam. Similarly, the horizontally polarized switching network employs RF circulators in its waveguide comparator portion 620-1, 620-2 for dual-plane steering of a horizontally-polarized beam. By switching from one set of feed horn pairs to a different, non-overlapping set of feed horn pairs, the present embodiment may generate an effect similar to diagonal beam steering by moving the beam from a vertically steered position to a horizontally steered position.

The in-beam-polarization-plane and orthogonal-to-beam-polarization-plane steering approaches are the same as those described with respect to FIG. 5, except that now both steering approaches are available across both feed horn polarizations. Feed horns of a given polarization are on separate switching networks, but in addition to switching the connections between the feed horns and the comparator, the sum and difference ports of the comparators for each switching network are also individually switched. This is done because each planar steering direction requires a separate comparator since, depending on steering direction, a given horn pair may be either in-plane or perpendicular-plane steered.

Figure 6B:
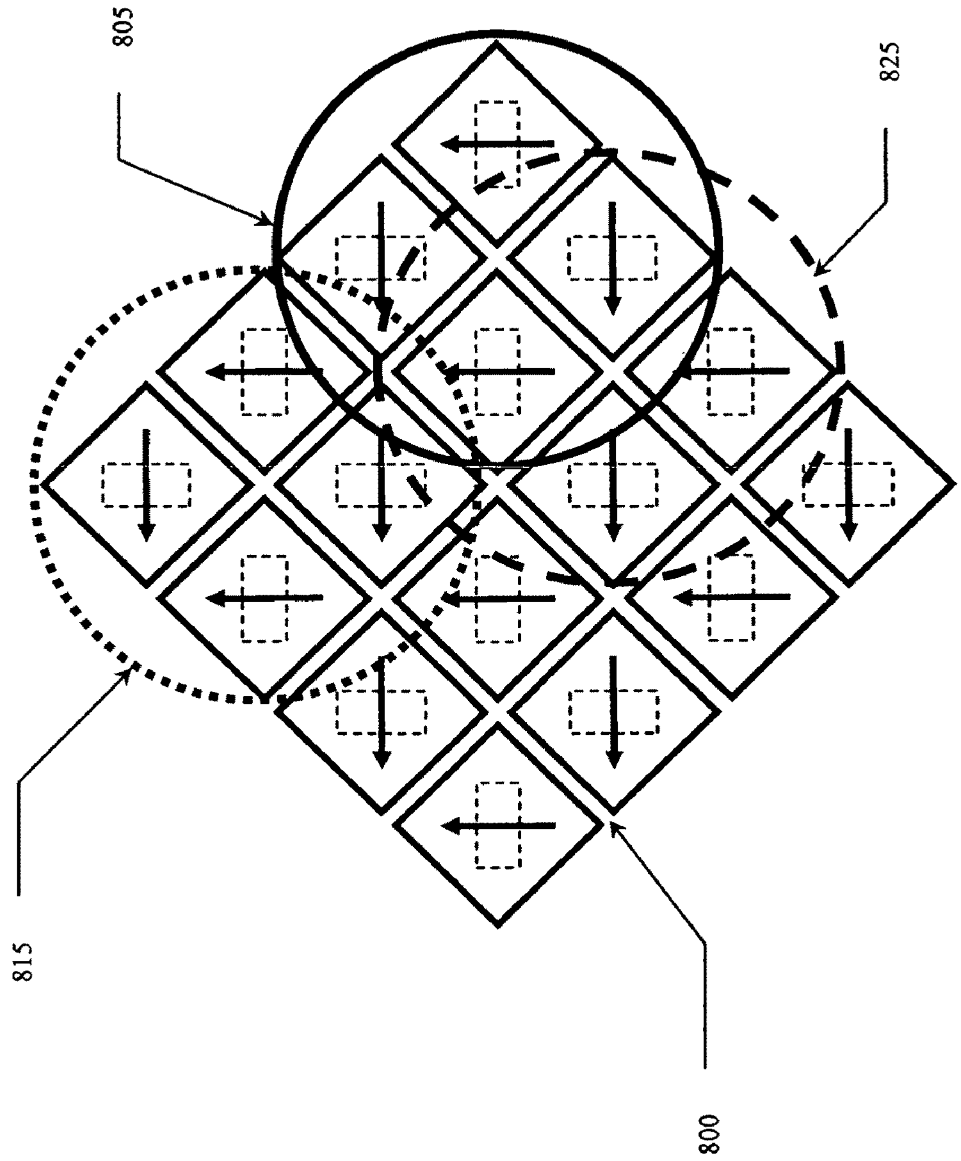
FIG. 6*b* shows an embodiment of the invention that illustrates dual-direction and diagonal steering of two orthogonally-polarized RADAR beams.

Diagonal beam steering may be accomplished in two different general ways, as shown in FIG. 6*b*. For a feed horn array having two different feed horn polarizations 800 and a switching network capable of dual-plane steering (not shown), the switching network may enable a switch from a first four-horn cluster 805 to a second, non-overlapping, similarly-arranged four-horn cluster 815. A more complex switching network that simultaneously allows a change from in-plane steering technique to perpendicular-plane steering technique for one polarization and a change from perpendicular-plane steering technique to in-plane steering technique for the second polarization is one approach for an embodiment of the present invention with finer steering control in the diagonal direction, so as to permit the activation of an oppositely-arranged four-horn cluster 825.

All the above-described embodiments of the present invention: single-planar-direction steered, dual-planar-direction steered, single-polarized, dual-polarized, single-beam, and dual-beam; all accomplish beam steering by shifting the phase center of a monopulse RADAR beam across a feed horn array. Each steering direction only requires a single comparator, the number of horns and the types of switches used determine the extent of hardware required, and no transducers, orthomode junctions, or mechanical steering and actuation components are required.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method for electronically steering a polarized monopulse RADAR beam across an array of RADAR feed horns in a planar direction defined by at least two co-planar, similarly polarized, stacked feed horn pairs, the method comprising:

activating the first feed horn pair, the first feed horn pair comprising a first and a second feed horn in the feed horn array, wherein the first and second feed horns are mutually adjacent, stacked orthogonal to the planar direction, and similarly polarized, to produce a RADAR beam from the phase center of the first feed horn pair;

de-activating the first feed horn pair; and activating the second feed horn pair, the second feed horn pair comprising a third and a fourth feed horn in the feed horn array, wherein the third and fourth feed horns are mutually adjacent, stacked orthogonal to the planar direction, and similarly polarized, and further wherein the second feed horn pair is adjacent and similarly polarized to the first feed horn pair, and wherein the second feed horn pair is co-planar to the first feed horn pair in the planar direction, said activating the second feed horn pair moving the phase center of the RADAR beam emitted from the feed horn array from the phase center of the first feed horn pair to the phase center of the second feed horn pair.

2. The method of claim 1, wherein said activating the first feed horn pair, said de-activating, and said activating the second feed horn pair are all accomplished by commutative switching of the feed horns.

3. The method of claim 2, wherein said commutative switching includes connecting and disconnecting the feed horn pairs to and from at least one radio-frequency comparator.

4. A method of dual-plane electronic beam steering of a polarized monopulse RADAR beam across an array of RADAR feed horns in two planar directions, wherein the first planar direction is a planar direction defined by at least three co-planar, similarly polarized, feed horns and the second planar direction is orthogonal to the first planar direction, the method comprising:

first planar direction steering by:

activating the first and second feeds horn as a first feed horn pair in the feed horn array, wherein the first and second feed horns are mutually adjacent, co-planar in the first planar direction, and similarly polarized, to produce the polarized RADAR beam from the phase center of the first horn pair;

de-activating said first feed horn; and activating a third polarized feed horn in the feed horn array to create a second feed horn pair including the second and third feed horns, wherein the third feed horn is adjacent to the second feed horn and co-planar and similarly polarized with respect to the first and second feed horns, said activating the second feed horn pair steering the polarized RADAR beam in the first planar direction by moving the phase center of the polarized RADAR beam emitted from the feed horn array from the phase center of the first horn pair to the phase center of the second horn pair;

second planar direction steering by:

activating said first feed horn pair;

de-activating said first feed horn pair; and activating a third horn pair comprising a fifth and a fourth feed horn in the feed horn array, wherein the fifth and fourth feed horns are mutually adjacent and co-planar in first planar direction, and polarized similarly to the first and second feed horns, and wherein the first horn pair is adjacent and co-planar to the third horn pair in the second planar direction, said activating the third horn pair steering the polarized RADAR beam in the second planar direction by moving the phase center of the polarized RADAR beam emitted from the feed horn array from the phase center of the first horn pair to the phase center of the third horn pair.

5. The method of claim 4, wherein all said activating and said de-activating steps are accomplished by commutative switching of the feed horns.

6. The method of claim 5, wherein said commutative switching includes connecting and disconnecting the feed horns to and from at least one radio-frequency comparator.

7. The method of claim 4, further comprising diagonal-to-first planar direction beam steering by:

activating the second feed horn pair;

de-activating the second feed horn pair; and activating the third feed horn pair, said activating the third feed horn pair steering the polarized RADAR beam diagonal to the first planar direction by moving the phase center of the polarized RADAR beam emitted from the feed horn array from the phase center of the second horn pair to the phase center of the third horn pair.

8. A method of electronically steering of a first polarized monopulse RADAR beam and a second polarized monopulse RADAR beam across an array of RADAR feed horns in a planar direction, where the first and second beam polarizations are orthogonal, the method comprising:

first beam steering by:

activating a first and a second feed horn as a first feed horn pair in the feed horn array, wherein the first and second feed horns are mutually adjacent, co-planar in the first planar direction, and polarized in the first polarization, to produce the first polarized RADAR beam from the phase center of the first horn pair;

de-activating said first feed horn; and activating a third feed horn in the feed horn array to create a second feed horn pair including the second and third feed horns, wherein the third feed horn is adjacent to the second feed horn and co-planar and similarly polarized with respect to the first and second feed horns, said activating a third feed horn steering the first polarized RADAR beam by moving the phase center of the first polarized RADAR beam emitted from the feed horn array from the phase center of the first horn pair to the phase center of the second horn pair;

second beam steering by:

activating a fourth and a fifth feed horn as a third feed horn pair in the feed horn array, wherein the fourth and fifth feed horns are mutually adjacent, co-planar in a direction orthogonal to the planar direction, and polarized in the second polarization, to produce the second polarized RADAR beam from the phase center of the third horn pair;

de-activating said third feed horn pair; and activating a fourth horn pair comprising a sixth and a seventh feed horn in the feed horn array, wherein the sixth and seventh feed horns are mutually adjacent and co-planar a direction orthogonal to the planar direction, and polarized in the second polarization, and wherein the third horn pair is adjacent and co-planar to the fourth horn pair in the planar direction, said activating a fourth horn pair steering the second polarized RADAR beam by moving the phase center of the second polarized RADAR beam emitted from the feed horn array from the phase center of the third horn pair to the phase center of the fourth horn pair.

9. The method of claim 8, wherein all said activating and said de-activating steps are accomplished by commutative switching of the feed horns.

10. The method of claim 8, wherein said commutative switching includes:

connecting and disconnecting the first, second, and third feed horns to and from a first radio-frequency comparator; and connecting and disconnecting the third and fourth feed horn pairs to and from a second radio-frequency comparator.

11. A method of dual-plane electronic beam steering of a first polarized monopulse RADAR beam and a second polarized monopulse RADAR beam across an array of RADAR feed horns in two orthogonal planar directions, wherein the first planar direction corresponds to the first beam polarization direction and the second planar direction corresponds to the second beam polarization direction and wherein the beam polarization directions are also orthogonal, the method comprising:

first beam first planar direction steering by:

activating a first and a second feed horn as a first feed horn pair in the feed horn array, wherein the first and second feed horns are mutually adjacent, co-planar in the first planar direction, and polarized in the first polarization direction, to produce the first polarized RADAR beam from the phase center of the first horn pair;

de-activating said first feed horn; and activating a third feed horn in the feed horn array to create a second feed horn pair, wherein the third feed horn is adjacent to the second feed horn and co-planar and similarly polarized with respect to the first and second feed horns, said activating a first and a second feed horn steering the first polarized RADAR beam in the first planar direction by moving the phase center of the first polarized RADAR beam emitted from the feed horn array from the phase center of the first horn pair to the phase center of the second horn pair;

first beam second planar direction steering by:

activating said first feed horn pair;

de-activating said first feed horn pair; and activating a third horn pair comprising a fourth and a fifth feed horn in the feed horn array, wherein the fourth and fifth feed horns are mutually adjacent and co-planar in first planar direction, and polarized in the first polarization direction, and wherein the first horn pair is adjacent and co-planar to the third horn pair in the second planar direction, said activating a third horn pair steering the first polarized RADAR beam in the second planar direction by moving the phase center of the first polarized RADAR beam emitted from the feed horn array from the phase center of the first horn pair to the phase center of the third horn pair;

second beam second planar direction steering by:

activating a sixth and a seventh feed horn as a fourth feed horn pair in the feed horn array, wherein the sixth and seventh feed horns are mutually adjacent, co-planar in the second planar direction, and polarized in the second polarization direction, to produce the second polarized RADAR beam from the phase center of the fourth horn pair;

de-activating said sixth feed horn; and activating an eighth feed horn in the feed horn array to create a fifth feed horn pair, wherein the eighth feed horn is adjacent to the seventh feed horn and co-planar and similarly polarized with respect to the sixth and seventh feed horns, said activating an eighth feed horn steering the second polarized RADAR beam in the second planar direction by moving the phase center of the second polarized RADAR beam emitted from the feed horn array from the phase center of the fourth horn pair to the phase center of the fifth horn pair;

second beam first planar direction steering by:

activating said fourth feed horn pair;

de-activating said fourth feed horn pair; and activating a sixth horn pair comprising a ninth and a tenth feed horn in the feed horn array, wherein the ninth and tenth feed horns are mutually adjacent and co-planar in second planar direction, and polarized in the second polarization direction, and wherein the fourth horn pair is adjacent and co-planar to the sixth horn pair in the first planar direction, said activating a sixth horn pair steering the second polarized RADAR beam in the first planar direction by moving the phase center of the second polarized RADAR beam emitted from the feed horn array from the phase center of the fourth horn pair to the phase center of the sixth horn pair.

12. The method of claim 11, wherein all said activating and said de-activating steps are accomplished by commutative switching of the feed horns.

13. The method of claim 11, wherein said commutative switching includes:

connecting and disconnecting the feed horns polarized in the first polarization to and from a first radio-frequency comparator; and connecting and disconnecting the feed horns polarized in the second polarization to and from a second radio-frequency comparator.

14. The method of claim 11, further comprising polarization-switched beam steering in a third planar direction by:

activating the first feed horn pair to emit a first-polarized RADAR beam;

de-activating the first feed horn pair; and activating a seventh feed horn pair comprising the eighth and tenth feed horns to emit a second-polarized RADAR beam, said activating the seventh feed horn pair steering the RADAR beam emitted from said feed horn array by moving the phase center of the RADAR beam emitted from the feed horn array from the phase center of the first horn pair to the phase center of the seventh horn pair and changing the polarization of the emitted beam from the first polarization to the second polarization.

15. An apparatus for electronically steering a polarized monopulse RADAR beam across an array of RADAR feed horn pairs in a planar direction defined by at least three co-planar, similarly polarized feed horns, the apparatus comprising:

a radio-frequency (RF) comparator;

a first feed horn pair including a first feed horn and a second feed horn, wherein the first and second feed horns are mutually adjacent, co-planar in the planar direction, and similarly polarized, and wherein the first feed horn pair produces a RADAR beam from its phase center when both of its feed horns are activated;

a second feed horn pair including a third feed horn and the second feed horn, wherein the third feed horn is adjacent to the second feed horn and co-planar and similarly polarized with respect to the first and second feed horns, and wherein the second feed horn pair produces a RADAR beam from its phase center when both of its feed horns are activated;

a switching device that selectively activates and deactivates the first and third feed horns and connects and disconnects the feed horns to and from the RF comparator, such that when the first feed horn is activated, the third feed horn is inactive and vice-versa, and when the first feed horn is connected to the RF comparator the third feed horn is disconnected from the RF comparator and vice-versa; and a set of wires disposed along a face of the feed horn array, wherein the set of wires includes at least two wires extending from the face of the array at an angle, such that the wires narrow the beamwidth of the RADAR beam, and wherein said wires are co-polarized to the beam polarization direction wherein the selective activation of the first and third feed horns steers the polarized monopulse RADAR beam emitted from the array of RADAR feed horn pairs by moving the phase center of the polarized RADAR beam emitted from the feed horn array from the phase center of the first horn pair to the phase center of the second horn pair.

16. The apparatus of claim 15, wherein the switching device includes a commutative switching network.

17. The apparatus of claim 15, wherein the commutative switching network includes at least one radio-frequency circulator operatively connected to the radio-frequency comparator.

18. An apparatus for electronically steering a polarized monopulse RADAR beam across an array of RADAR feed horns in a planar direction defined by at least two co-planar, similarly polarized, stacked feed horn pairs, the apparatus comprising:

a radio-frequency (RF) comparator;

a first feed horn pair comprising a first and a second feed horn in the feed horn array, wherein the first and second feed horns are mutually adjacent, co-planar in a plane orthogonal to the planar direction, and similarly polarized, and wherein the first feed horn pair produces a polarized monopulse RADAR beam from its phase center when both of its feed horns are activated;

a second feed horn pair comprising a third and a fourth feed horn in the feed horn array, wherein the third and fourth feed horns are mutually adjacent, co-planar to each-other in a plane orthogonal to the planar direction, and similarly polarized to the first and second feed horns, wherein the second feed horn pair is adjacent to the first feed horn pair and co-planar to the first feed horn pair in the planar direction, and wherein the second feed horn pair produces a polarized monopulse RADAR beam from its phase center when both of its feed horns are activated;

a switching device that selectively activates and de-activates the first and second feed horn pairs and connects and disconnects the feed horns of each feed horn pair to and from the RF comparator, such that when the first feed horn pair is activated and connected to the RF comparator, the second feed horn pair is inactive and disconnected from the RF comparator, and vice-versa;

wherein the selective activation of the first and second feed horn pairs steers the polarized monopulse RADAR beam emitted from the array of RADAR feed horn pairs by moving the phase center of the polarized RADAR beam emitted from the feed horn array from the phase center of the first horn pair to the phase center of the second horn pair.

19. The apparatus of claim 18, further comprising a set of wires disposed along a face of the feed horn array, wherein the set of wires includes at least two wires extending from the face of the array at an angle, such that the wires narrow the beamwidth of the RADAR beam, and wherein said wires are co-polarized to the beam polarization direction.

20. The apparatus of claim 18, wherein the switching device includes a commutative switching network.

21. The apparatus of claim 20, wherein the commutative switching network includes at least two radio-frequency circulators operatively connected to the radio-frequency comparator.

22. An apparatus for dual-plane electronic beam steering of a polarized monopulse RADAR beam across an array of RADAR feed horns in two planar directions, wherein the first planar direction is a planar direction defined by at least three co-planar, similarly polarized feed horns and the second planar direction is orthogonal to the first planar direction, the apparatus comprising:

a radio-frequency (RF) comparator;

a first feed horn pair including a first feed horn and a second feed horn, wherein the first and second feed horns are mutually adjacent, co-planar in the first planar direction, and similarly polarized, and wherein the first feed horn pair produces a polarized monopulse RADAR beam from its phase center when both of its feed horns are activated;

a second feed horn pair including a third feed horn and the second feed horn, wherein the third feed horn is adjacent to the second feed horn and co-planar and similarly polarized with respect to the first and second feed horns, and wherein the second feed horn pair produces a polarized monopulse RADAR beam from its phase center when both of its feed horns are activated;

a third feed horn pair comprising a fifth and a fourth feed horn in the feed horn array, wherein the fifth and fourth feed horns are mutually adjacent, co-planar in the first planar direction, and similarly polarized with respect to the first, second and third feed horns, and further wherein the third feed horn pair is adjacent and similarly polarized to the first feed horn pair and co-planar to the first feed horn pair in the second planar direction, and wherein the third feed horn pair produces a polarized monopulse RADAR beam from its phase center when both of its feed horns are activated;

a first switching device that selectively activates and deactivates the first and third feed horn pairs and connects and disconnects the feed horns of the first and third feed horn pair to and from the RF comparator, such that when the first feed horn pair is activated and connected to the RF comparator, the third feed horn pair is inactive and disconnected from the RF comparator, and vice-versa, wherein the selective activation of the first and third feed horn pairs steers the polarized monopulse RADAR beam emitted from the array of RADAR feed horn pairs in the second planar direction by moving the phase center of the polarized RADAR beam emitted from the feed horn array from the phase center of the first horn pair to the phase center of the third horn pair;

a second switching device that selectively activates and deactivates the first and third feed horns and connects and disconnects the first and third feed horns to and from the RF comparator, such that when the first feed horn is activated, the third feed horn is inactive and vice-versa, and when the first feed horn is connected to the RF comparator the third feed horn is disconnected from the RF comparator and vice-versa, wherein the selective activation of the first and third feed horns steers the polarized monopulse RADAR beam emitted from the array of RADAR feed horn pairs in the first planar direction by moving the phase center of the polarized RADAR beam emitted from the feed horn array from the phase center of the first horn pair to the phase center of the second horn pair; and a third switching device that manages the connection and activation of feed horns such that only one feed horn pair is allowed to be active and connected to the comparator during RADAR beam emission.

23. The apparatus of claim 22, wherein the first, second, and third switching devices comprise a commutative switching network.

24. The apparatus of claim 23, wherein the commutative switching network includes at least three radio-frequency circulators operatively connected to the radio-frequency comparator.

25. The apparatus of claim 22, further comprising a set of wires disposed along a face of the feed horn array, wherein the set of wires includes at least three wires extending from the face of the array at an angle, such that the wires narrow the beamwidth of the RADAR beam, and wherein said wires are co-polarized to the beam polarization direction.

26. An apparatus for dual-plane electronic beam steering of a first polarized monopulse RADAR beam and a second polarized monopulse RADAR beam across an array of RADAR feed horns in two orthogonal planar directions, wherein the first planar direction corresponds to the first beam polarization and the second planar direction corresponds to the second beam polarization and wherein the beam polarizations are also orthogonal, the apparatus comprising:

a first radio-frequency (RF) comparator;

a second RF comparator;

a first feed horn pair including a first feed horn and a second feed horn, wherein the first and second feed horns are mutually adjacent, co-planar in the first planar direction, and first polarized, and wherein the first feed horn pair produces a first polarized monopulse RADAR beam from its phase center when both of its feed horns are activated;

a second feed horn pair including a third feed horn and the second feed horn, wherein the third feed horn is adjacent to the second feed horn, first polarized, and co-planar with respect to the first and second feed horns, and wherein the second feed horn pair produces a first polarized monopulse RADAR beam from its phase center when both of its feed horns are activated;

a third feed horn pair comprising a fifth and a fourth feed horn in the feed horn array, wherein the fifth and fourth feed horns are mutually adjacent, co-planar in the first planar direction, and first polarized, and further wherein the third feed horn pair is adjacent and co-planar to the first feed horn pair in the second planar direction, and wherein the third feed horn pair produces a first polarized monopulse RADAR beam from its phase center when both of its feed horns are activated;

a fourth feed horn pair including a sixth feed horn and a seventh feed horn, wherein the sixth and seventh feed horns are mutually adjacent, co-planar in the second planar direction, and second polarized, and wherein the fourth feed horn pair produces a second polarized monopulse RADAR beam from its phase center when both of its feed horns are activated;

a fifth feed horn pair including an eighth feed horn and the seventh feed horn, wherein the eighth feed horn is adjacent to the seventh feed horn, second polarized, and co-planar with respect to the sixth and seventh feed horns, and wherein the fifth feed horn pair produces a second polarized monopulse RADAR beam from its phase center when both of its feed horns are activated;

a sixth feed horn pair comprising a ninth and a tenth feed horn in the feed horn array, wherein the ninth and tenth feed horns are mutually adjacent, co-planar in the second planar direction, and second polarized, and further wherein the sixth feed horn pair is adjacent and co-planar to the fourth feed horn pair in the first planar direction, and wherein the sixth feed horn pair produces a second polarized monopulse RADAR beam from its phase center when both of its feed horns are activated;

a first switching device that selectively activates and deactivates the first and third feed horn pairs and connects and disconnects the feed horns of the first and third feed horn pair to and from the first RF comparator, such that when the first feed horn pair is activated and connected to the first RF comparator, the third feed horn pair is inactive and disconnected from the first RF comparator, and vice-versa, wherein the selective activation of the first and third feed horn pairs steers the first polarized monopulse RADAR beam emitted from the array of RADAR feed horn pairs in the second planar direction by moving the phase center of the first polarized RADAR beam emitted from the feed horn array from the phase center of the first horn pair to the phase center of the third horn pair;

a second switching device that selectively activates and deactivates the first and third feed horns and connects and disconnects the first and third feed horns to and from the first RF comparator, such that when the first feed horn is activated, the third feed horn is inactive and vice-versa, and when the first feed horn is connected to the first RF comparator the third feed horn is disconnected from the first RF comparator and vice-versa, wherein the selective activation of the first and third feed horns steers the first polarized monopulse RADAR beam emitted from the array of RADAR feed horn pairs in the first planar direction by moving the phase center of the first polarized RADAR beam emitted from the feed horn array from the phase center of the first horn pair to the phase center of the second horn pair;

a third switching device that selectively activates and deactivates the fourth and sixth feed horn pairs and connects and disconnects the feed horns of the fourth and sixth feed horn pair to and from the second RF comparator, such that when the fourth feed horn pair is activated and connected to the second RF comparator, the sixth feed horn pair is inactive and disconnected from the second RF comparator, and vice-versa, wherein the selective activation of the fourth and sixth feed horn pairs steers the second polarized monopulse RADAR beam emitted from the array of RADAR feed horn pairs in the first planar direction by moving the phase center of the second polarized RADAR beam emitted from the feed horn array from the phase center of the fourth horn pair to the phase center of the sixth horn pair;

a fourth switching device that selectively activates and deactivates the sixth and eighth feed horns and connects and disconnects the sixth and eighth feed horns to and from the second RF comparator, such that when the sixth feed horn is activated, the eighth feed horn is inactive and vice-versa, and when the sixth feed horn is connected to the second RF comparator the eighth feed horn is disconnected from the second RF comparator and vice-versa, wherein the selective activation of the sixth and eighth feed horns steers the second polarized monopulse RADAR beam emitted from the array of RADAR feed horn pairs in the second planar direction by moving the phase center of the second polarized RADAR beam emitted from the feed horn array from the phase center of the fourth horn pair to the phase center of the horn pair;

a fifth switching device that manages the connection and activation of the first, second, and third feed horn pairs to the first RF comparator such that only one feed horn pair is allowed to be active and connected to the first RF comparator during first polarized monopulse RADAR beam emission; and a sixth switching device that manages the connection and activation of the fourth, fifth, and sixth feed horn pairs to the second RF comparator such that only one feed horn pair is allowed to be active and connected to the second RF comparator during second polarized monopulse RADAR beam emission.

27. The apparatus of claim 26, further comprising a wire grid disposed along a face of the feed horn array, wherein the wire grid includes:

at least a two second polarized wires aligned in the first planar direction, such that the second polarized wires narrow the beamwidth of the first polarized RADAR beam; and at least two first polarized wires aligned in the second planar direction, such that the first polarized wires narrow the beamwidth of the second polarized RADAR beam.

28. The apparatus of claim 26, wherein the first, second, and fifth switching devices comprise a first commutative switching network and further wherein the third, fourth, and sixth switching devices comprise a second commutative switching network.

29. The apparatus of claim 28, wherein the first commutative switching network includes at least three radio-frequency circulators operatively connected to the first RF comparator and further wherein the second commutative switching network includes at least three radio-frequency circulators operatively connected to the second RF comparator.

30. The apparatus of claim 28, further comprising a seventh switching device that:

controls the first and second switching networks such that the feed horns in the RADAR feed horn array are activated in four-horn clusters comprising a first-polarized feed horn pair and a second-polarized feed horn pair; and coordinates the first and second switching networks such that the first and second switching networks both steer in the same planar direction at the same time.

31. The apparatus of claim 30, further comprising an eighth switching device that:

changes the switching network connections such that the first-polarized feed horns are governed and steered by the second switching network and the second-polarized feed horns are governed and steered by the first switching network, thereby allowing beam steering across overlapping four-horn clusters that are not co-planar in either the first or second planar directions.

32. The apparatus of claim 31, wherein the seventh and eighth switching devices comprise a control switching network.

33. The apparatus of claim 26, wherein the first polarization is a vertical polarization and the second polarization is a horizontal polarization.

34. The apparatus of claim 26, wherein the first planar direction is the horizontal direction and the second planar direction is the vertical direction.

35. The apparatus of claim 26, wherein the feed horns in the array of RADAR feed horns are dielectrically loaded.

36. The apparatus of claim 26, wherein the feed horns in the array of RADAR feed horns are made of Rexolite.

37. The apparatus of claim 26, wherein the feed horns in the array of RADAR feed horns are diagonal feed horns.

38. The apparatus of claim 26, further comprising a Cassegrain reflector that focuses and directs the emitted RADAR beams.

39. The apparatus of claim 26, wherein the apparatus includes at least part of a target location or acquisition system on a guided munition.

40. A method for electronically steering a polarized monopulse RADAR beam across an array of RADAR feed horn pairs in a planar direction defined by at least three co-planar, similarly polarized, diagonal feed horns, the method comprising:

activating the first and second feed horns as a first feed horn pair in the feed horn array, wherein the first and second feed horns are mutually adjacent, to produce the RADAR beam from the phase center of the first feed horn pair;

de-activating the first feed horn;

activating the third feed horn in the feed horn array to create a second feed horn pair including the second and third feed horns, wherein the third feed horn is adjacent to the second feed horn, said activating the second feed horn pair moving the phase center of the RADAR beam emitted from the feed horn array from the phase center of the first feed horn pair to the phase center of the second feed horn pair; and narrowing the beamwidth of the RADAR beam with a set of wires disposed along a face of the feed horn array, wherein the set of wires includes at least two wires extending from the face of the array at an angle, and wherein said wires are co-polarized to the beam polarization direction.

41. A method for electronically steering a polarized monopulse RADAR beam across an array of RADAR feed horns in a planar direction defined by at least two co-planar, similarly polarized, stacked feed horn pairs, the method comprising:

activating the first feed horn pair, the first feed horn pair comprising a first and a second feed horn in the feed horn array, wherein the first and second feed horns are mutually adjacent, stacked orthogonal to the planar direction, and similarly polarized, to produce the RADAR beam from the phase center of the first feed horn pair;

de-activating the first feed horn pair;

activating the second feed horn pair, the second feed horn pair comprising a third and a fourth feed horn in the feed horn array, wherein the third and fourth feed horns are mutually adjacent, stacked orthogonal to the planar direction, and similarly polarized, and further wherein the second feed horn pair is adjacent and similarly polarized to the first feed horn pair, and wherein the second feed horn pair is co-planar to the first feed horn pair in the planar direction, said activating the second feed horn pair moving the phase center of the RADAR beam emitted from the feed horn array from the phase center of the first feed horn pair to the phase center of the second feed horn pair; and narrowing the beamwidth of the RADAR beam with a set of wires disposed along a face of the feed horn array, wherein the set of wires includes at least two wires extending from the face of the array at an angle, and wherein said wires are co-polarized to the beam polarization direction.

42. A method of dual-plane electronic beam steering of a polarized monopulse RADAR beam across an array of RADAR feed horns in two planar directions, wherein the first planar direction is a planar direction defined by at least three co-planar, similarly polarized, feed horns and the second planar direction is orthogonal to the first planar direction, the method comprising:

first planar direction steering by:

activating the first and second feeds horn as a first feed horn pair in the feed horn array, wherein the first and second feed horns are mutually adjacent, co-planar in the first planar direction, and similarly polarized, to produce the polarized RADAR beam from the phase center of the first horn pair;

de-activating said first feed horn; and activating a third polarized feed horn in the feed horn array to create a second feed horn pair including the second and third feed horns, wherein the third feed horn is adjacent to the second feed horn and co-planar and similarly polarized with respect to the first and second feed horns, said activating the second feed horn pair steering the polarized RADAR beam in the first planar direction by moving the phase center of the polarized RADAR beam emitted from the feed horn array from the phase center of the first horn pair to the phase center of the second horn pair;

second planar direction steering by:

activating said first feed horn pair;

de-activating said first feed horn pair; and activating a third horn pair comprising a fifth and a fourth feed horn in the feed horn array, wherein the fifth and fourth feed horns are mutually adjacent and co-planar in first planar direction, and polarized similarly to the first and second feed horns, and wherein the first horn pair is adjacent and co-planar to the third horn pair in the second planar direction, said activating the third horn pair steering the polarized RADAR beam in the second planar direction by moving the phase center of the polarized RADAR beam emitted from the feed horn array from the phase center of the first horn pair to the phase center of the third horn pair; and narrowing the beamwidth of the RADAR beam with a set of wires disposed along a face of the feed horn array, wherein the set of wires includes at least three wires extending from the face of the array at an angle, and wherein said wires are co-polarized to the beam polarization direction.

* * * * *